United States Patent [19]
Effenberger

[11] Patent Number: 5,841,563
[45] Date of Patent: Nov. 24, 1998

[54] METHOD AND SYSTEM FOR EFFICIENT OPTICAL TRANSMISSION OF NTSC VIDEO

[75] Inventor: Frank J. Effenberger, New Providence, N.J.

[73] Assignee: Bell Communications Research, Inc., Morristown, N.J.

[21] Appl. No.: 738,648

[22] Filed: Oct. 29, 1996

Related U.S. Application Data

[60] Provisional application No. 60/024,280 Aug. 21, 1996.

[51] Int. Cl.$^6$ .............................. H04B 10/04; H04J 14/08
[52] U.S. Cl. ..................... 359/158; 359/137; 348/528; 348/533; 348/534; 348/682; 348/683
[58] Field of Search .................................. 348/528, 533, 348/682, 683, 534, 607, 678, 608, 680; 359/158, 161, 173, 180, 188, 189, 195, 125, 137

[56] References Cited

U.S. PATENT DOCUMENTS

| | | | |
|---|---|---|---|
| 3,699,256 | 10/1992 | Roth | 328/135 |
| 4,010,322 | 3/1977 | Nathanson | 340/311 |
| 4,216,497 | 8/1980 | Ishman et al. | 358/84 |
| 5,161,187 | 11/1992 | Kajita et al. | 380/15 |
| 5,210,606 | 5/1993 | Lagoni et al. | 358/148 |
| 5,379,075 | 1/1995 | Nagasawa et al. | 348/678 |
| 5,387,941 | 2/1995 | Montgomery et al. | 348/473 |
| 5,598,274 | 1/1997 | Ogura et al. | 358/335 |
| 5,717,469 | 2/1998 | Jennes et al. | 348/571 |

OTHER PUBLICATIONS

"The Clipping Penalty in Fiber–Based, Combined AM–VSB . . . ", G. R. Joyce et al., *IEEE Phot. Tech. Lett.*, vol. 6, No. 11, pp. 1368–1370, Nov. 1994.

"Optimization of Fiber/Coax Upgrades for FITL Systems . . . ", T. E. Chaprun et al., NFOEC '94, pp. 329–340 (1994).

"Transmission and distribution of a multichannel AM–VSB TV signal . . . ", C. J. Richard et al., *Ann. Telecommun.*, 49, No. 9–10, pp. 527–542, 1994.

*Primary Examiner*—Leslie Pascal
*Attorney, Agent, or Firm*—Joseph Giordano; David A. Hey; Loria B. Yeadon

[57] ABSTRACT

A technique for delivering analog video over fiber-to-the-home (FTTH) networks addresses a fundamental problem of the standard signal format, i.e., power budget constraint, by increasing the usable optical signal efficiency. In particular, a technique is provided for transmitting an efficient modified analog video which is compatible with existing receivers. More specifically, the synchronization portion of a standard NTSC video signal is reduced in amplitude during transmission, producing an appreciable increase in the allowable optical modulation index (OMI).

18 Claims, 5 Drawing Sheets

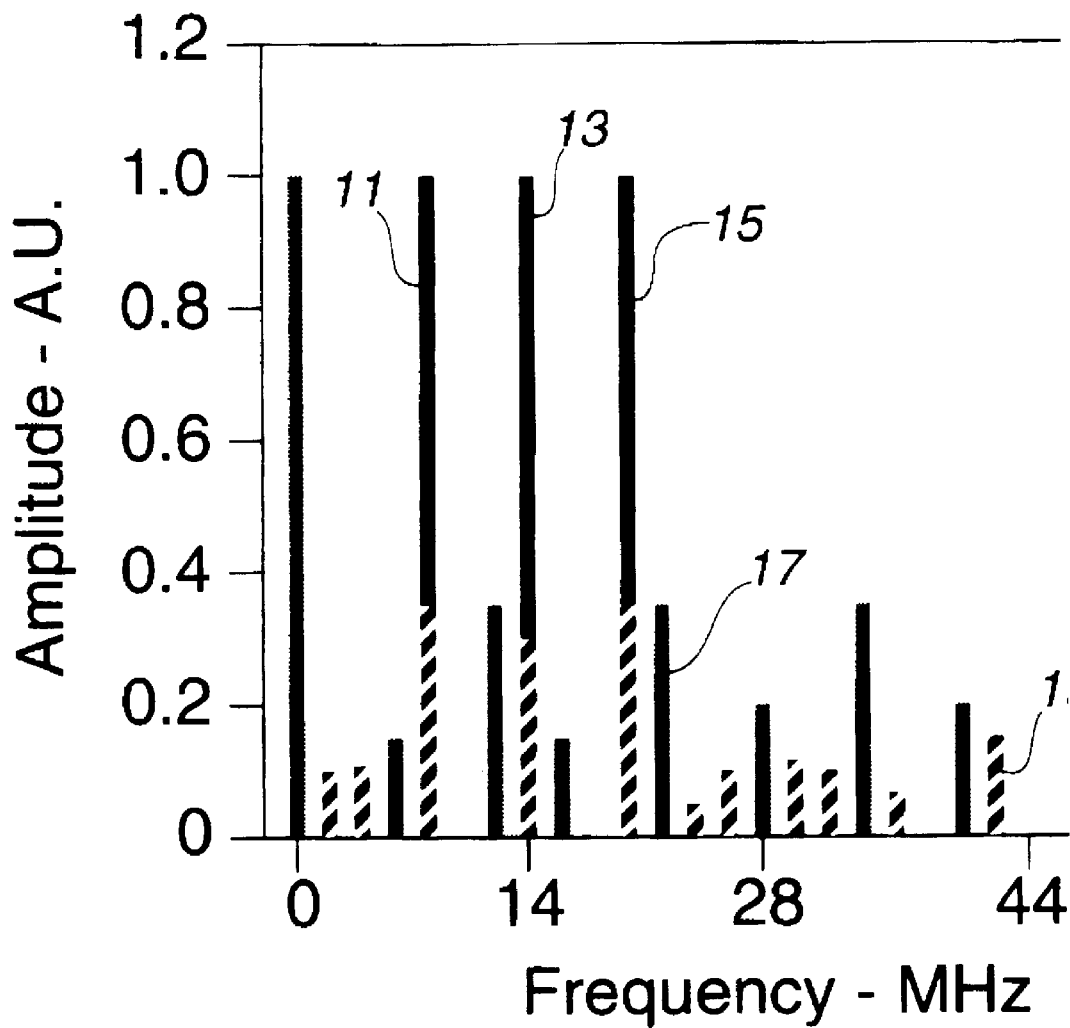
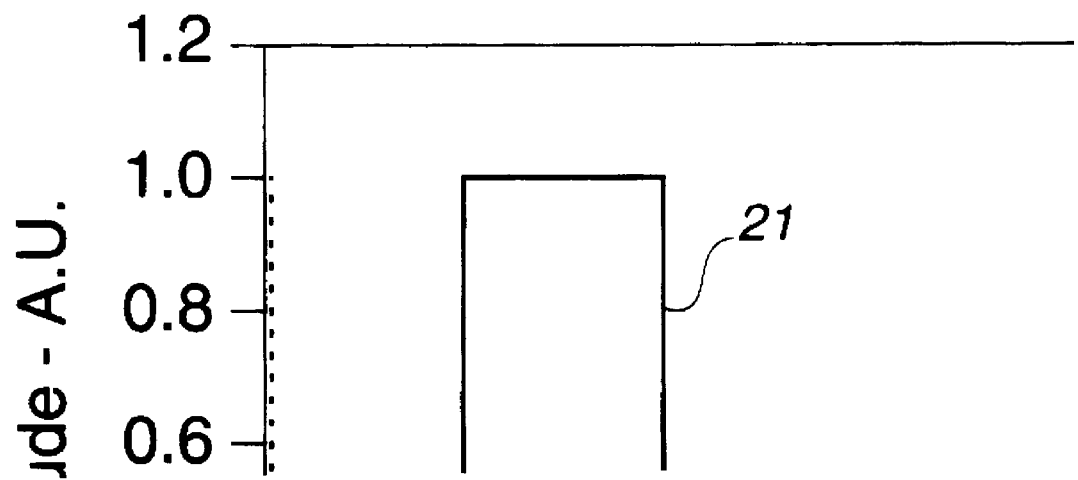

METHOD AND SYSTEM FOR EFFICIENT OPTICAL TRANSMISSION OF NTSC VIDEO

RELATED APPLICATION

This application claims the benefit of U.S. Provisional application Ser. No. 60/024,280, filed 21 Aug. 1996, entitled "Efficient Optical Transmission Of NTSC Video".

BACKGROUND OF THE INVENTION

This invention relates to the field of optical signal transmission. More particularly, it relates to a method and system for transmitting NTSC video signals in a modified format to reduce distortion without additional equipment and in a manner compatible with existing systems.

There is a substantial market for transmitting high-quality amplitude modulation, vestigial sideband (AM-VSB) video in national television standard committee (NTSC) format over optical fiber. Currently, this technique is used entirely in the feeder portion of existing networks, where the high equipment costs can be shared over many customers. Now, as networks evolve towards higher interactivity, the fiber is moving deeper into the access network. The ultimate goal of this evolution is fiber-to-the-home (FTTH). The salient questions are whether analog video over FTTH technically feasible, and how much will it cost. These questions have been previously addressed, e.g., by G. R. Joyce, R. Olshansky, and R. Gross, "The Clipping Penalty in Fiber-Based, Combined AM-VSB and Compressed-Digital-Video Transmission Systems", *IEEE Phot. Tech. Lett.* Vol. 6, No. 11, pp. 1368–70, (1994); and by T. Chapuran and K. Lu, "Optimization of Fiber/Coax Upgrades for FITL Systems with Analog & Digital Video Transmission", NFOEC'94, pp. 329–40 (1994). These works indicate that while analog video over fiber is definitely feasible in these applications, it demands high power and linearity from the optical transmitter and receiver, as suggested by C. J. Richard et al., "Transmission and distribution of a multichannel AM-VSB TV signal on a single mode optical fiber for CATV video-communication networks", *Ann. Telecommun.* 49, pp. 527–542, 1994. Such technical constraints translate into costs that are too high in a FTTH setting.

To illustrate this, consider the analog video fiber transmission systems available today. The technical constraints are well understood, and all the straightforward methods of performance enhancement have already been used. In other words, optical analog is a mature technology. The current costs for the transmitters are high, and these cannot be shared by many optical receivers. For example, a typical 550 MHz transmitter costs about $7,500 and has just enough power to serve 8 receivers at a range of about 6.1 km. The receivers are nontrivial pieces of equipment, requiring both low noise and distortion. The typical receiver costs about $1,000. Using these costs, optical analog would cost about $2000 per terminal node, even if the fiber were free. To be cost effective, the optical node must be shared by many subscribers; however, in FTTH systems there is a node at each subscriber. Thus, the key is to make optical analog less expensive.

The source of the problem is the fragile nature of the AM-VSB signal. This format is actually very efficient in bandwidth, because it delivers the uncompressed information content of NTSC video (100 Mb/s) in a bandwidth of 6 MHz. This high bandwidth efficiency implies a signal that is very susceptible to noise and transmission impairments. This is attested to by the fact that a carrier to noise ratio (CNR) of over 43 dB is required for the signal to be of acceptable quality. The specification for composite second order (CSO) distortion dictates that the total power of all carrier intermodulation products falling in a channel be 55 dB below the carrier power in that channel. Even more, the specification for composite triple order (CTO) interference requires that the third order intermodulation power in a channel be 60 dB below the carrier power for that channel (it is noted that the term CTO is used here to refer to all the distortion products that originate from the third order non-linearity of the system; the commonly used composite triple beat (CTB) refers only to a subset of the possible products). These very stringent requirements place a heavy burden on the transmission equipment.

In order to understand these requirements for an optical transmission system, consider first the problem of CNR. This quantity is given by the following equation for a single channel, $$CNR = \frac{\frac{1}{2}(P_R R m)^2}{\sigma_N^2}$$

where $P_R$ is the received power, R is the responsivity of the receiver, m is the optical modulation index per channel, and $\sigma_N^2$ is the received noise power in the channel bandwidth. The numerator is the received radio frequency (RF) power of any one carrier. Because the signal is subcarrier multiplexed, each carrier is given only a share of the threshold limited total swing of the optical power. This sharing is described by the optical modulation index, m, given by $$m = \frac{P_{peakcarrier} - P_{bias}}{P_{bias}}$$

where $P_{peakcarrier}$ is the optical power when the carrier is at its positive peak excursion, and $P_{bias}$ is the optical power corresponding to the quiescent bias condition of the transmitter. If the assumption is made that the carriers are mutually independent random signals, then the sum of the carriers can be described as a Gaussian distributed stochastic process. The normalized standard deviation of this sum is called the RMS modulation index, $\mu$. The expression for the RMS index for N channels is $$\mu = m\sqrt{\frac{N}{2}}$$

If $\mu$ is made too small, then the received electrical power is reduced. If $\mu$ is made too large, then the probability that the laser will be driven below threshold becomes considerable. Standard practice has been to set the RMS modulation index to be 0.25 to 0.33, which is equivalent to setting the clipping threshold 4 to 3 standard deviations away from the mean of the signal distribution, respectively. For a numerical example, a system that delivers 50 channels of AM video with a m of 0.25 would require a received power of −9 dBm. (Assuming $\sigma_N^2 = -106$ dBm, m=0.05, and R=7.36 $W^{1/2}$).

In addition to clipping, there are more nonlinear distortions that occur during transmission. Directly modulated diode lasers have appreciable nonlinearity, especially in the higher output power portion of their characteristic and in the vicinity of their threshold. The modulation of the laser can cause its emission to be chirped in wavelength. This can cause distortion of the signal when it is transmitted through dispersive fiber. The introduction of fiber amplifiers can increase distortions due to chirp. Finally, the receiver will introduce its part to the total nonlinearity of the link.

The received RF power can be increased by increasing the optical power, increasing the RMS index, or the responsivity of the receiver. It is unlikely that the responsivity can be meaningfully improved over current values, and increasing $\mu$ has the undesirable side-effect of increasing the clipping probability. Therefore, the only independent control on RF signal power is received optical power. Unfortunately, optical sources capable of handling analog signals are expensive on a dollar per watt basis, and this puts a considerable premium on this method of CNR improvement.

The noise power has several sources: relative intensity noise (RIN) of the laser, shot noise of the light signal, thermal noise of the receiver, and the excess noise of the electronics. The noise power is determined by the quality of the components used and by universal constants of nature. The quality of the components commonly used today are already at a level of refinement that makes further improvement difficult and expensive. Because cost is an important issue, especially in FTTH architecture, a reasonable assumption is that the noise performance of the system is primarily fixed. In fact, the expense of optical power and the irreducibility of the noise power makes cost reduction difficult.

SUMMARY OF THE INVENTION

It is an object of the invention to address the above noted limitations of the prior art. More specifically, it is an object of the invention to provide an improved system and method for optical transmission of video which does not require a substantially more complex receiver. It is an additional object of the invention to provide an improved optical transmission system for video signals which is backwards compatible with most customer video equipment now in place. It is a further object of the invention to provide improved optical transmission of video signals which may be reproduced without objectionable artifacts and disturbances, and that are indistinguishable from an NTSC standard signal.

In fulfillment of these objects, the present invention provides a method and system in which the standard NTSC video is modified such that the synchronization (sync.) signals are reduced in amplitude by a predetermined amount, for example, by about 50%. This reduces the distortion that the signal suffers when passed through a nonlinear channel, such as an optical fiber network. This modulation is done in such a way that requires no additional circuitry or equipment.

Other objects and features of the invention are made apparent from the detailed description of preferred embodiments of the invention set forth below.

BRIEF DESCRIPTION OF THE DRAWING

The present invention will be described with reference to the accompanying drawing of which:

FIG. 1 is an illustration of out of band, in band visible, and in band invisible distortion;

FIG. 2 is an illustration of a fifty channel, single octave, incoherent NTSC video frequency plan;

DESCRIPTION OF THE INVENTION

Figure 3:
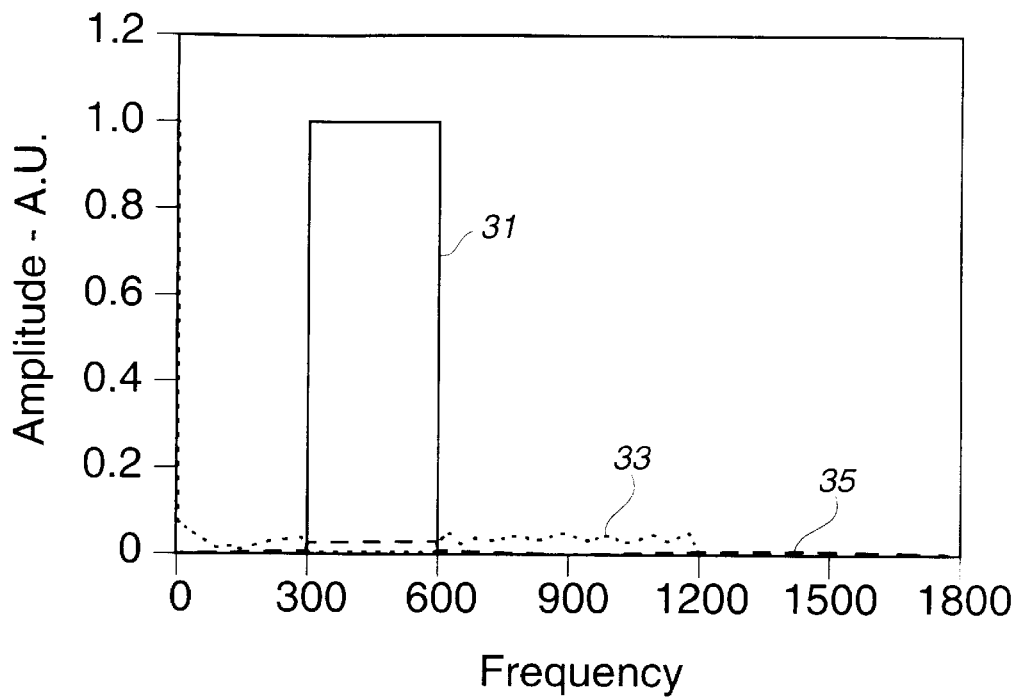
FIG. 3 is an illustration of the distortion spectra that result from quadratically phased coherent carriers.

Specific examples of the invention are now described below in reference to the accompanying drawings. As made clear from these examples, the invention advantageously employs a modified transmission format for NTSC video. The term "modified" implies that the format is generally based on the existing standards and that the additions or changes to that format are small. For example, changing the carrier frequencies for transmission would be a modification, while digitizing the signal for transmission would not be a modification. The reason for this constraint is the first requirement of modified format: The modified format should not require a substantially more complex receiver.

The reason for this is economic. Any reduction in system cost due to format change arises from the increased sharing of the transmitter. However, any increased complexity in the receiver required by the new format will tend to increase the system cost. Consider the following example. Suppose that in the future, a FTTH system can use a $2,000 transmitter to drive 16 receivers (one per subscriber) that cost $100. The total per subscriber cost is $225. If a format change allows the transmitter sharing to increase by a factor of two, but also requires a receiver that is twice as expensive, then the cost per line unit (LU) is $63 (transmitter)+$200 (receiver)= $263. The cost has gone up because the savings in the shared transmitter are more than offset by the similar cost increase in the non-shared receivers.

The second requirement stems from the desire for backwards compatibility with most of the customer video equipment now in place. This is not an easy task, because there are many older television sets that were basically designed to work off-the-air with an antenna. There are also several varieties of "cable-ready" televisions. This leads us to the following statement of the second requirement for a modified signal system: The signal delivered to the subscriber should be compatible with any current cable-ready receivers. This requirement basically excludes the consideration of older equipment. While this may seem to be deleterious to the potential marketing of the service, it will not for the following reasons. First, any "problem" receivers can be provisioned by using a cable compatible tuner set top box (STB) This kind of device costs only $50–$100, and is commonly rented to the cable subscriber for about $1/month. Second, this exclusion is the basic policy of many cable providers today. Therefore, the competitive market share and financial impact of this requirement will be minimal.

The third requirement is one having to do with quality. This issue is very complex, because beauty, or in this case image quality, is in the eye of the beholder. The specifications for CNR, CSO, and CTO noted earlier really do not give a complete description of image quality. These specifications refer to certain measurements made with non-video modulated test signals. They do not take into account the resulting visual patterns produced by the noise or distortion. Certain types of noise may be very disturbing, while others may be almost invisible, even though they result in the same CNR measurement. For these reasons, the quality requirement should be reinterpreted: The signal should produce an image and sound that are free from objectionable artifacts and disturbances, and that are indistinguishable from the NTSC standard signal.

A first possible modification to the NTSC transmission standard is simply to change the carrier frequency assignments. It must be remembered that the FCC standard assignments were intended for broadcasting, and had to deal with previous frequency allocations and older technology limitations. With the advent of broadband cable, there was a need to develop channel plans that were more suited to cable systems. Currently, there are three different plans which have been devised by the EIA/NCTA to accommodate the wide bandwidth and contiguous allocation of television channels. There is the standard plan, the incrementally related carrier (IRC) plan, and the harmonically related carrier (HRC) plan. The standard plan leaves all the VHF channels in their off-air locations. The IRC plan does this also except for channels 5 and 6, which are shifted 2 MHz higher. The HRC plan shifts all the channels down by 1.25 MHz from their IRC assignments.

Since these channel plans have become standardized, they satisfy the compatibility requirement set forth above. There are still two questions to be answered, though: which plan, and what channels to use. Both of these questions require the consideration of distortion and how it disturbs picture quality. If a set of unmodulated carriers are sent through a link that has second and third order nonlinearity, a multitude of frequency mixing products will be generated. These spurious frequencies can be divided into three classes: out-of-band, in-band-visible, and in-band-invisible.

This is illustrated in FIG. 1, where a hypothetical three carrier system is shown (the vertical scale is in arbitrary units, A.U.). The carriers 11, 13, 15 are 8 MHz, 14 MHz, and 20 MHz, respectively, and each channel extends 1.25 MHz below to 4.75 MHz above each carrier. Second and third order distortion products, e.g., 17 and 19, respectively, appear in many places in the band. Those that are below 6.75 MHz or above 24.75 MHz are out-of-band type products. Products such as the 22 MHz second harmonic 17 are in-band-visible, because they fall in a channel and would produce a strong visible signal. Products that fall exactly on carrier frequencies potentially belong to the in-band-invisible class. These nonlinear products will result in a zero to very low frequency modulation of the channel involved, and if the carrier frequencies are stable and precise these products will be practically invisible to the viewer. This results in a 5 to 10 dB power improvement in apparent distortion performance.

The ideal channel plan would be such that all the intermodulation products fall either out of band or are invisible. The plan that best satisfies this criterion is the HRC plan with a channel line-up that occupies less than a single octave. Let us assume that 50 channels are desired, and that the lowest frequencies possible should be used. This would result in using harmonics 50 through 99 as the carriers. The resulting multicarrier signal, V(t), can then be written as a finite sum involving the channel signals $S_i(t)$, the channel spacing frequency, $\omega_0$, and the carrier phases, $\phi_i$.

$$V(t) = \sum_{i=50}^{99} S_i(t) \cos(n\omega_0 t + \phi_i)$$

The operation of such a scheme is diagrammed in FIG. 2, where the fundamental, CSO, and, CTO spectra 21, 23, 25 are plotted for the case of unmodulated carriers. The amplitudes of the CSO and CTO, in this FIG. and all the following FIG.s, are each normalized by a constant factor so that they can be plotted on the same scale as the fundamental. In practice, the distortion products would be much lower in amplitude. Note that all the CSO components fall either below or above the single octave band, showing that single octave systems completely avoid CSO. The CTO spectrum unfortunately peaks right in the center of the fundamental band; however, all the distortion products fall exactly upon the carrier frequencies. Thus, by the mechanism described above, they will impair the signal less. Furthermore, if the CSO and the CTO are of comparable magnitude, as they are in most systems, then we could conceivably allow the CTO power to become 3 dB larger without reducing visual quality because we have eliminated the CSO. This shifting of specification margin would have to be justified with actual subjective image quality studies.

The spectra given in FIG. 2 were computed assuming that the carriers are all incoherent (randomly phased in time) with respect to one another. When this is the case, the power of each distortion product can be added to find the total power at a particular frequency. However, because the carrier phases, $\phi_i$, are now random variables, this spectrum is only an average power distribution. There will be times when the phases drift in such a way to produce strong coherence, and at these times the distortion will be much worse. This time-varying distortion behavior would be difficult to predict and control, and would produce objectionable visual interference.

In fact, one cannot have a strict HRC system where the carriers are incoherent. The phase of a carrier is simply the time integral of the instantaneous frequency of the carrier. If the carrier frequencies are exactly harmonically locked together, then it follows that their phases are locked together in a fixed relationship. While the initial phase relationship may have been random over frequency, it remains fixed over time. In other words, the phases are perfectly time correlated; they are not time-random, and thus do not satisfy the incoherent assumption referred to above.

What is needed is some set of carrier phases such that the coherent sum of all the distortion products is minimized. Several such systems have been proposed, but the simplest arrangement is the so called Newman phases. The phases are set so that the phase of each carrier is quadratically dependent on the carrier harmonic number, written as, $$\phi_i = \pi \frac{i^2}{N}$$

This phasing has been shown numerically to reduce the peak value of the multicarrier signal. It therefore produces low distortion. This can be seen in FIG. 3, where the CSO 31 and CTO 33 of the quadratic phase system is shown. The distortion is lower than the incoherent case, the average improvement being 3 dB (amplitude), while at the same time the distortion is constant in time and thus less visible.

Figure 4:
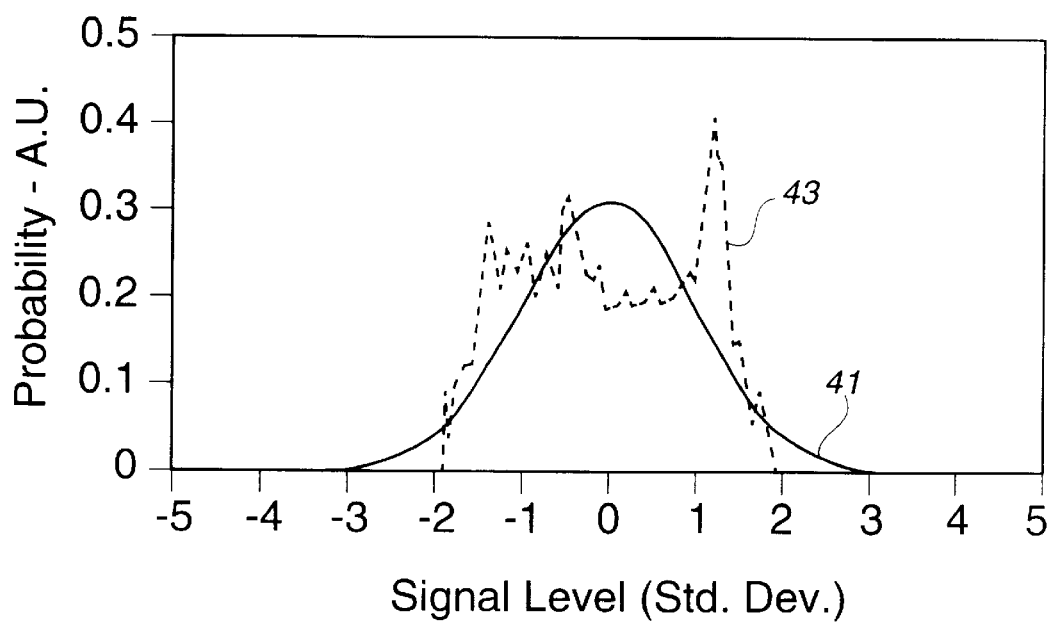
FIG. 4 is an illustration of the histograms of signal voltage for incoherent and quadratic phase coherent carrier systems.

The results above assume that the transmission link transfer function can be characterized by a power series expansion. In the case of analog optical, this is only true for signals that remain within the operating region of the laser. When the signal drives the laser below threshold, the optical signal cannot follow, and clipping distortion results. This kind of impairment can be studied by considering the distribution of the multicarrier signal. The distributions for the incoherent case 41 and the quadratically phased coherent case 43 are compared in FIG. 4.

One can see that in the incoherent case 41, the distribution is almost Gaussian, as one would expect from a sum of independent random variables. The standard practice is to adjust the dynamic range of the signal so that the laser threshold occurs at a point 3 to 4 standard deviations out on one side of this Gaussian distribution. Even doing this, the carrier sum will occasionally get clipped. The coherent distribution, on the other hand, is much more compact and uniform. Furthermore, it does not have any extensive wings. This would enable the increase of the dynamic range of the carrier by 2.2 to 3.4 dB (amplitude) while at the same time eliminating all occurrences of clipping. It is also interesting to note that the histogram of the signal is asymmetric and unevenly distributed. Both of these unique features result from the deterministic properties of the quadratically phased carriers.

Figure 5:
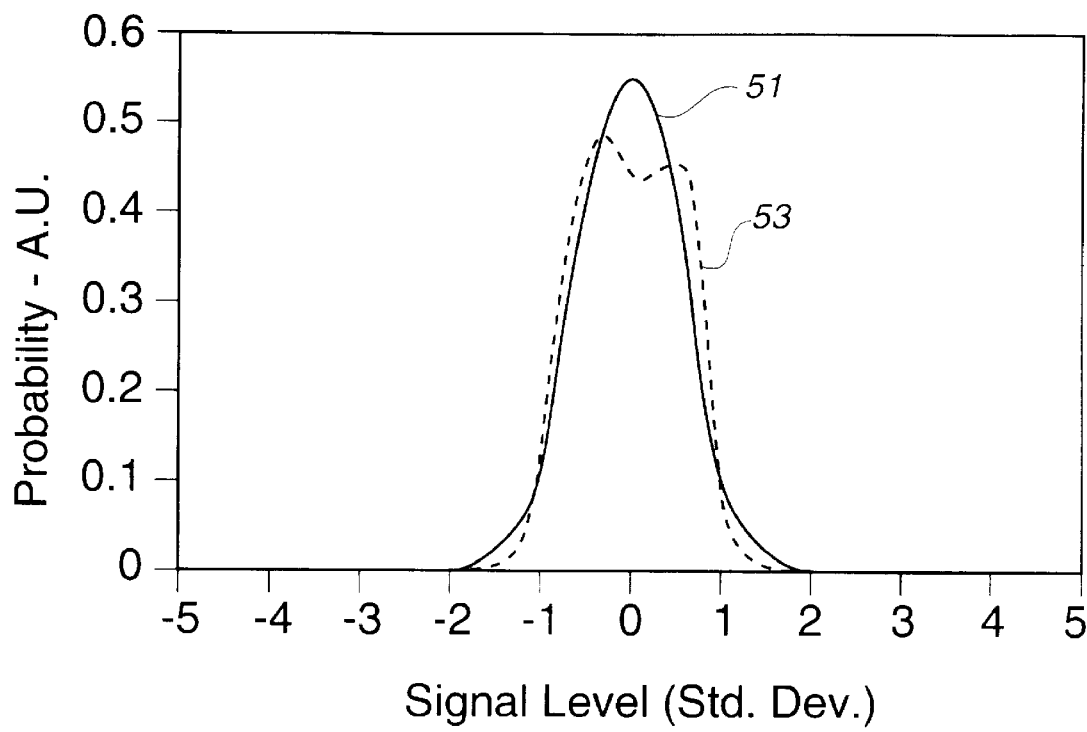
FIG. 5 is an illustration of the signal voltage for incoherent and quadratic phase coherent modulated carriers.

All of the preceding examples involve unmodulated carriers. To compute the effects of video modulation, the channel signals will be assumed to be unsynchronized and to have visual signals that are uniformly distributed random variables. Assuming that the many different signals arrive from diverse sources, then the signals are uncorrelated in time. Computing the distributions of signal level for the modulated case yields the results in FIG. 5. Note that the incoherent signal 51 has remained Gaussian, but its variance has been reduced markedly. This effect is a direct consequence of the modulation reducing the average signal level. The distribution for the coherent, quadratic phase signal 53 has become narrower in variance, but has unfortunately become slightly larger in total extent. Modulation causes this slight degradation because some of the carriers are reduced to low levels while others are still high. When this happens, the cancellation that occurs almost perfectly in the unmodulated case is incomplete. This results in momentary peaks in the signal. However, the coherent signal is still less widely distributed than the incoherent signal, and it would have approximately 1 to 2 dB (amplitude) advantage over the incoherent system in terms of clipping penalty.

Figure 6:
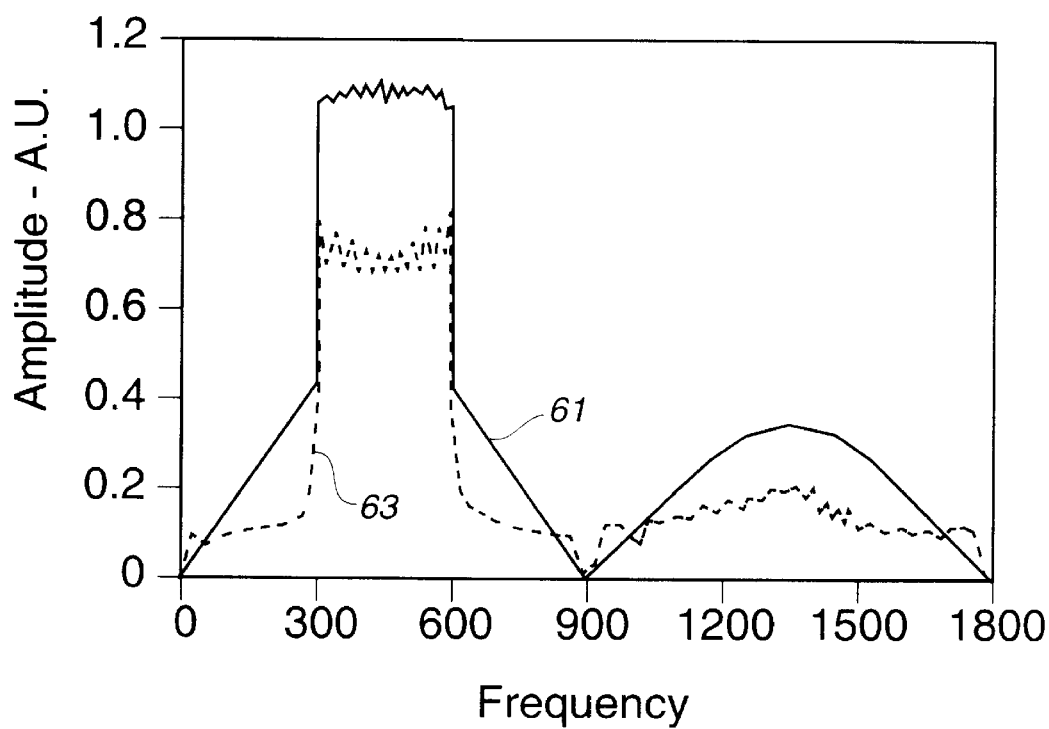
FIG. 6 is an illustration of the distortion spectra of incoherent and quadratically phased coherent modulated carriers.

In terms of distortion the average CTO spectrum for the incoherent 61 and phase coherent 63 cases with modulation are shown in FIG. 6. The average improvement in CTO of the coherent quadratic phased single octave HRC system and the random phased incoherent single octave HRC systems, both with modulation, is 1.7 dB (amplitude).

From the analysis above, video modulation has a strong influence on both the distortion and the clipping behavior of the multicarrier signal. Thus, it may be possible to modify the modulation format so that the distortion and clipping behavior is enhanced. Such a technique is now described in reference to FIGS. 7 to 9.

Figure 7:
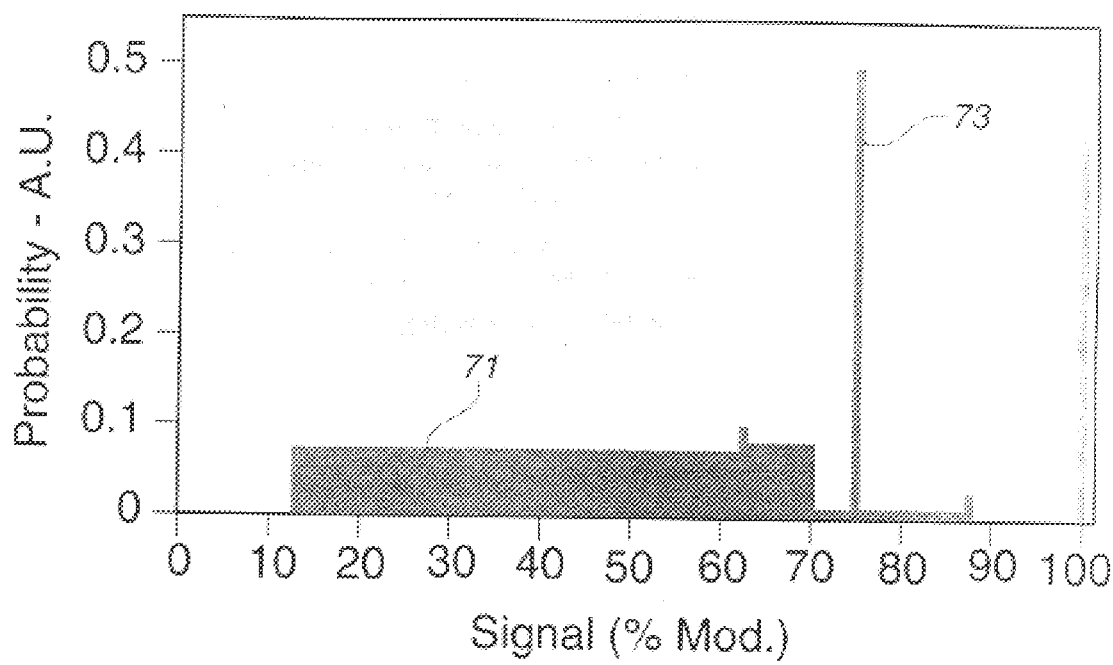
FIG. 7 is an illustration of a histogram of a NTSC signal with uniformly distributed video information.

The amplitude distribution of an NTSC signal is illustrated in FIG. 7, which is a histogram of a NTSC signal with uniformly distributed video information. The low, uniform part 71 of the distribution is the actual video information, whereas the high, sharp elements 73 represent the synchronization part of the signal. The sync. signals 73 are the highest amplitude elements of the signal, and as such are a significant source of distortion. For this reason, modifying the sync. part of the signal has the greatest potential for providing some distortion improvement.

Figure 8:
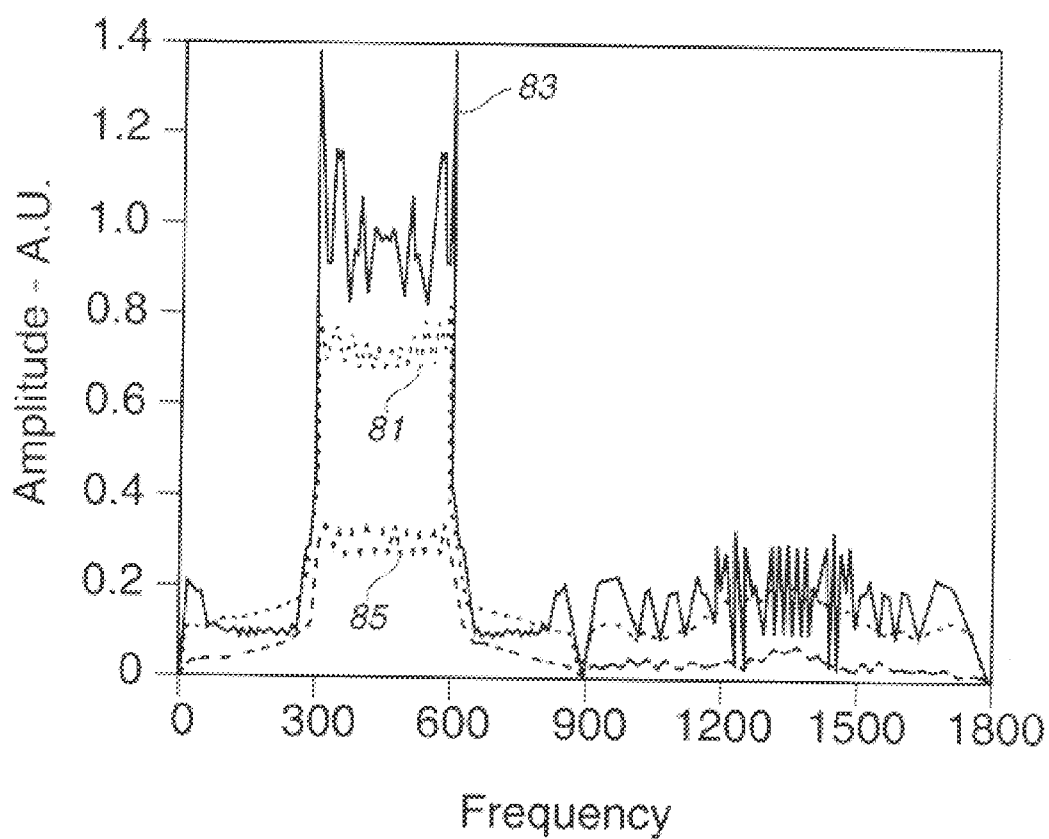
FIG. 8 is an illustration of the CTO spectra for coherent carriers with random standard sync. pulses.

Normally, the individual channels in an ensemble are all frame random, that is, the video frame phases are uncorrelated. Thus, a first change is to synchronize all the channels together on a frame by frame basis. By doing this, all the video signals would be in the sync. interval at the same time. If this is done, then the total distortion power is actually worse than the frame random case, as shown in FIG. 8 (illustrating the CTO distortion spectra for coherent carriers with random standard sync. pulses 81, synchronized standard sync. pulses 83, and synchronized modulated sync. pulses 85). However, most of the distortion is occurring during the sync. period, and so would not produce spurious patterns in the video. Such distortion could produce incorrect black level, frame jitter, and color matching problems through interference with the synchronizing signals of the video.

Therefore, locking all the video channels together in sync. can affect distortion levels. Because the video programming on a typical system comes from many different independent sources, the feed signals will not be synchronized. This can be resolved by directing the feed video streams into a four field buffer. Each stream can then be delayed by the appropriate time so that they are all brought into synchronism.

Because the sync. signal does effect the distortion, real improvement can be had by modifying the NTSC synchronization signal. It should be noted that the duration, bandwidth, and signal level of the sync. signal was chosen partly to make the construction of receivers cheap and simple, and partly to cope with a noisy and uncertain wireless transmission medium. For these reasons, the information density of the sync. signal is very low, and compression of this portion of the signal is possible.

The invention realizes this compression by reducing the gain of the transmitter RF amplifier by 3 dB (amplitude) during the sync. period, while simultaneously increasing the RF gain of the receiver by a similar amount. An example of such a system that would do this for frame synchronized channels is diagrammed in FIG. 9.

Figure 9:
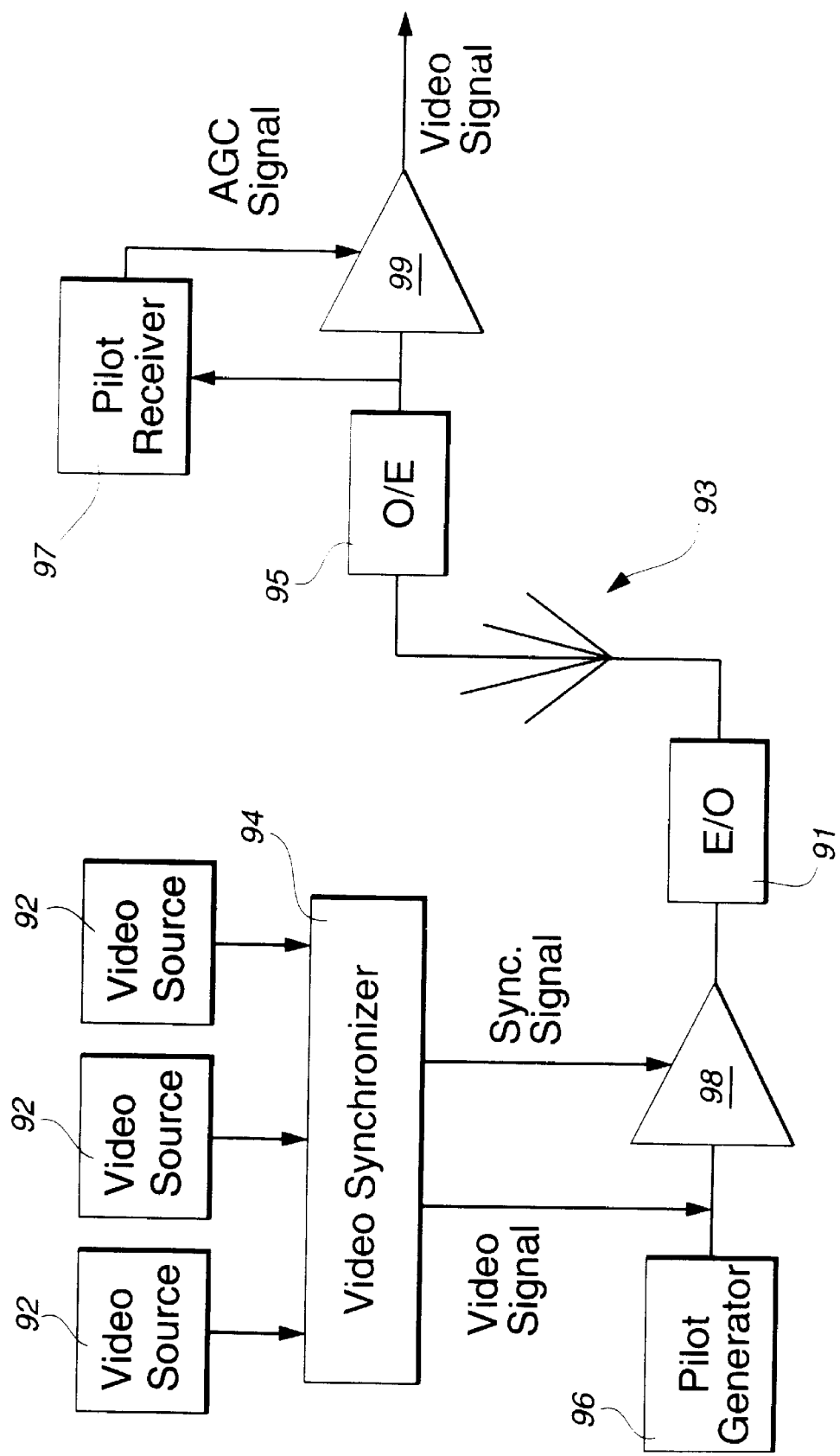
FIG. 9 is a block diagram of an illustrative synchronized modulated sync. pulse system in accordance with one embodiment of the invention.

In FIG. 9, a plurality of video sources 92 provide respective video signals to a video synchronizer 94. The video synchronizer 94 delays the received video signals by an appropriate time to bring each signal into synchronism. The video synchronizer 94 generates an output baseband video signal and a sync. signal. These signals are provided as shown to an adjustable gain RF amplifier 98.

In addition to the video signals on the optical link, a pilot tone generator 96 produces a "constant" pilot tone that is used for automatic gain control (AGC) of the adjustable gain amplifier 98. When the sync. period is detected, the gain of the adjustable gain RF amplifier 98 is reduced. This reduces the signal levels and thus relieves the distortion. Because the pilot tone shares the RF amplifier 98, it is also reduced in amplitude.

The modulated signal output from the adjustable gain amplifier 98 is converted to an optical format with E/O converter circuit 91 and then transmitted through the optical fiber network 93. The signal arrives at the receiver, which in this example, comprises O/E converter circuit 95, pilot receiver circuit 97, and adjustable gain amplifier 99.

The modulated signal is received by O/E converter 95 which converts the optical signal into an electrical signal. Pilot receiver 97 detects the pilot tone portion of the received signal and produces an adjustable gain control (AGC) signal in response thereto. The AGC signal adjusts the gain of a second adjustable gain amplifier 99, thereby detecting the decline in power during the sync. period and forcing a gain increase suitable to recover the original signal. This compression can be accomplished easily because all of the channels are locked in frame synchronism. This enables the multichannel to be processed in bulk, cheaply, by a single modulation amplifier.

Using this method of sync. modulation, the resulting distortion spectrum, as shown in FIG. 8, is reduced by 3.5 dB (amplitude) when compared with normal sync. video. The cost of this improvement is that the SNR of the sync period would be degraded by 6 dB (power). However, the sync. portion of the typical modern receiver is very immune to noise through the use of phase locked loop (PLL) technology. Also, because of the digital nature of the sync. signal, there is a threshold SNR, and thus the 6 dB reduction in SNR shall not have any effect on received quality.

The cost in terms of equipment for sync. modulation is minimal. The pilot tone AGC circuitry is not complicated or expensive to implement, and in fact is typically already present to correct for the linear characteristics of the optical link. Similar arguments apply to the sync. detector and gain modulator needed at the transmitter.

It is noted that the method according to the invention bears a superficial resemblance to some of the simple "video scrambling" methods used in cable television for many years. The motivation for scrambling is to control access to certain select channels. In these systems, the sync. portion of the individual channel to be scrambled is shifted down by approximately 0.5 times the full range of the video signal. This shifting is done to the signal while it is a baseband video signal and before it is placed on its RF carrier. The signal then requires a special descrambler device to recover the original signal. This descrambler works by first demodulating the scrambled signal to a baseband video format, then shifting the sync. portion back up to its correct level.

The invention described herein is different because 1) the motivation is to reduce distortion, not interdict channels; 2) the sync. signal is modulated (multiplied), not shifted; 3) the sync. modulation occurs to all the channels in the ensemble, not selected ones; 4) the sync. modulation is done in the RF domain, not at baseband; 5) there is no need for any additional equipment, no descramblers.

In summary, the synchronization pulse modulation method described herein operates by reducing the transmitted power during the synchronization intervals in the NTSC signal. Assuming that the carried channels are all frame synchronous, this kind of signal is easily recovered, and thus this method will not add significant cost to the receiver. By modulating the sync. pulses, the distortion is reduced by an additional 3.5 dB (amplitude). This would result in an optical modulation index (OMI) increase of 1.2 dB. Thus, by changing the transmission standards in a backward compatible way, small but meaningful increases in the OMI can be made.

The improvements obtained with the present invention are even more significant when combined with the above described single octave harmonically related carrier frequency assignment method and the coherent quadratic phase assignment method. For example, I have found that the total improvement in OMI that can be had using these methods is 3.8 dB. For FTTH, this would reduce the required power at the subscriber by 3.8 dB, and therefore result in a two-fold increase in transmitter sharing.

The invention has now been described by reference to preferred embodiments, in fulfillment of the objects of the invention. These embodiments have been set forth merely as examples. Variations and modifications will be apparent to those skilled in the art without departing from the spirit and scope of the invention.

What is claimed is:

1. A method for reducing distortion in an NTSC video signal comprising the steps of:

a) providing a plurality of video signals from respective sources;

b) synchronizing the video signals and generating a sync. signal associated therewith;

c) modulating the video signals and the sync. signal with a transmitting RF amplifier, the gain of the transmitting amplifier being reduced a predetermined amount during a sync. period during which the sync. signal is transmitted, the predetermined amount being measured relative to the gain of the transmitting amplifier during periods during which the video signals are transmitted; and d) receiving the modulated video signals and the sync. signal with a receiver that is tuned and detected by automatic gain control circuitry, the automatic gain circuitry detecting a relative decline in power during the sync. period and forcing a gain increase corresponding to the predetermined amount.

2. The method according to claim 1 wherein the predetermined amount is about 50%.

3. The method according to claim 1 wherein the sync. signal and the modulated video signals are transmitted via optical fiber.

4. A broadcasting system having reduced distortion in an NTSC video signal comprising:

a) means for providing a plurality of video signals from respective sources;

b) means for synchronizing the video signals and generating a sync. signal associated therewith;

c) means for modulating the video signals and the sync. signal with a transmitting RF amplifier, the gain of the transmitting amplifier being reduced a predetermined amount during a sync. period during which the sync. signal is transmitted, the predetermined amount being measured relative to the gain of the transmitting amplifier during periods during which the video signals are transmitted; and d) means for receiving the modulated video signals and the sync. signal with a receiver that is tuned and detected by automatic gain control circuitry, the automatic gain circuitry detecting a relative decline in power during the sync. period and forcing a gain increase corresponding to the predetermined amount.

5. The system according to claim 4 wherein said predetermined amount is about 50%.

6. The system according to claim 4 wherein the sync. signal and the modulated video signals are transmitted via optical fiber.

7. A method of transmitting modified NTSC video signals in a format characterized by reduced distortion comprising the steps of:

a) generating a plurality of video signals;

b) synchronizing the plurality of video signals utilizing a synchronizing signal; and c) transmitting the plurality of video signals and the synchronizing signal over optical fiber with an adjustable gain amplifier, the gain of the adjustable gain amplifier being reduced during intervals during which the synchronizing signal is transmitted.

8. The method according to claim 7 wherein the gain of the adjustable gain amplifier is reduced by about 50%.

9. The method according to claim 7 further comprising the step of receiving transmitted video signals and the synchronizing signal, the received signals being amplified with an adjustable gain amplifier configured to increase its gain during the periods corresponding to the synchronizing signal by an amount corresponding to an amount by which the transmitted synchronizing signal is decreased.

10. A system of transmitting modified NTSC video signals in a format characterized by reduced distortion comprising:

a) means for generating a plurality of video signals;

b) means for synchronizing the plurality of video signals utilizing a synchronizing signal; and c) means for transmitting the plurality of video signals and the synchronizing signal over optical fiber with an adjustable gain amplifier, the gain of the adjustable gain amplifier being reduced during intervals during which the synchronizing signal is transmitted.

11. The system according to claim 10 wherein the gain of the adjustable gain amplifier is reduced by about 50%.

12. The system according to claim 10 further comprising means for receiving transmitted video signals and the synchronizing signal, the received signals being amplified with an adjustable gain amplifier configured to increase its gain during the periods corresponding to the synchronizing signal by an amount corresponding to an amount by which the transmitted synchronizing signal is decreased.

13. A video transmitter comprising:

a) video synchronizer circuit which synchronizes respective outputs from a plurality of video sources to produce a video signal and a sync. signal;

b) pilot generator which produces a pilot tone; and c) an adjustable gain RF receiver for producing a modulated, modified analog video signal on the basis of the video signal, the sync. signal, and the pilot tone, the gain of the RF receiver being reduced by a predetermined amount during periods during which the sync. signal is detected.

14. The video transmitter according to claim 13, wherein the modulated, modified analog video signal is converted to an optical signal which is transmitted along an optical fiber network.

15. The video transmitter according to claim 13 wherein the predetermined amount is 50%.

16. A video receiver comprising:

a) a pilot receiver circuit which detects a pilot signal from a received, modulated analog video signal and produces a gain control signal in response thereto, the received, modulated analog video signal being attenuated by a predetermined amount during periods corresponding to a sync. signal; and b) an adjustable gain amplifier which demodulates the received analogy video signal to produce a baseband video signal, the gain of the amplifier being adjusted on the basis of the gain control signal whereby the gain of the received, modulated analog signal is increased by the predetermined amount to recover the sync. signal.

17. The video receiver according to claim 16 wherein the received analog video signal is converted to an electrical signal from an optical signal prior to being provided to the pilot receiver circuit and the adjustable gain amplifier.

18. The video receiver according to claim 16 wherein the predetermined amount is 50%.

* * * * *